(12) United States Patent
Chen et al.

(10) Patent No.: US 9,740,699 B1
(45) Date of Patent: Aug. 22, 2017

(54) FILE CREATION WITH LOCATION LIMITATION CAPABILITY IN STORAGE CLUSTER ENVIRONMENTS

(71) Applicant: International Business Machines Corporation, Armonk, NY (US)

(72) Inventors: Dong Chen, Beijing (CN); Ling Chen, Beijing (CN); Li Ni Zhang, Beijing (CN); Min Min Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/263,659

(22) Filed: Sep. 13, 2016

(51) Int. Cl.
*G06F 17/30* (2006.01)

(52) U.S. Cl.
CPC .. *G06F 17/30082* (2013.01); *G06F 17/30194* (2013.01); *G06F 17/30917* (2013.01)

(58) Field of Classification Search
CPC ......... G06F 17/30082; G06F 17/30194; G06F 17/30917; G06F 17/30221
USPC ................. 707/694, 821, 827, 828
See application file for complete search history.

(56) References Cited

U.S. PATENT DOCUMENTS

| 8,589,355 | B2 | 11/2013 | Nagpal et al. |
| 8,656,454 | B2 | 2/2014 | Gunawardena et al. |
| 2005/0203910 | A1* | 9/2005 | Taguchi ................ G06F 3/0605 |
| 2005/0267972 | A1* | 12/2005 | Costa-Requena ....... H04L 67/16 709/227 |
| 2007/0225962 | A1* | 9/2007 | Brunet ................ G06F 11/1451 703/23 |
| 2012/0158647 | A1* | 6/2012 | Yadappanavar .. G06F 17/30153 707/609 |
| 2012/0166389 | A1* | 6/2012 | Shiozawa ......... G06F 17/30088 707/610 |
| 2014/0052945 | A1 | 2/2014 | Ashok et al. |
| 2015/0006596 | A1 | 1/2015 | Fukui et al. |

OTHER PUBLICATIONS

Mell, Peter et al.; "The NIST Definition of Cloud Computing"; NIST National Institute of Standards and Technology; U.S. Department of Commerce; Recommendations of the National Institute of Standards and Technology; Special Publication 800-145; Sep. 2011; 7 Pages.

* cited by examiner

*Primary Examiner* — Hares Jami
(74) *Attorney, Agent, or Firm* — Hoffman Warnick LLC

(57) ABSTRACT

A system, method and program product for creating files in a cloud environment having a storage cluster. As system is provided having a command processor that parses an inputted file creation command and determines whether a location tag is specified for a file being created and stored in the storage cluster; and a location limitation processor that, in response to the location tag being specified: retrieves a creation limitation profile associated with the location tag; causes the file to be created with a location limitation in the storage cluster based on the creation limitation profile; and stores an identifier for the creation limitation profile in an extended inode structure.

20 Claims, 5 Drawing Sheets

FILE CREATION WITH LOCATION LIMITATION CAPABILITY IN STORAGE CLUSTER ENVIRONMENTS

TECHNICAL FIELD

The subject matter of this invention relates to creating files in a cloud environment, and more particularly to a system and method for limiting the location of files created in a cloud environment.

BACKGROUND

In today's computing era, data management is quickly migrating towards cloud based environments having cluster storage. In most cluster file system designs, data is distributed across multiple servers at different data centers to create redundancy and maximize performance. Cluster storage provides a distributed file system that runs concurrently on multiple network attached storage nodes. Clustering provides access to all files from any clustered node regardless of the physical location of the file. The number and location of the nodes are transparent to the users and applications accessing them. Thus, end users and associated applications are generally not aware of the physical location of their data. However, because the data can be readily accessed, this transparency generally does not create an issue.

However, certain use cases require data to be created and stored at a fixed location that is readily identifiable by the end user. For example, there may exist legal implications, security requirements and/or audit policies that limit the storage of data to a known location. In these cases, current cloud based environments cannot be utilized for data storage because cluster file systems are inherently designed to distribute data across multiple servers.

SUMMARY

Aspects of the disclosure provide a system, method and program product for limiting a location of data being created and stored in a cloud environment.

A first aspect discloses a file creation system for a storage cluster, including: a command processor that parses an inputted file creation command and determines whether a location tag is specified for a file being created and stored in the storage cluster; and a location limitation processor that, in response to the location tag being specified: retrieves a creation limitation profile associated with the location tag; causes the file to be created with a location limitation in the storage cluster based on the creation limitation profile; and stores an identifier for the creation limitation profile in an extended inode structure.

A second aspect discloses a computer program product stored on a computer readable storage medium, which when executed by a computing system, provides a file creation system for a storage cluster, the program product including: program code that parses an inputted file creation command and determines whether a location tag is specified for a file being created and stored in the storage cluster; and program code that, in response to the location tag being specified: retrieves a creation limitation profile associated with the location tag; causes the file to be created with a location limitation in the storage cluster based on the creation limitation profile; and stores an identifier for the creation limitation profile in an extended inode structure.

A third aspect discloses a computerized method that provides file creation for a storage cluster, comprising: parsing an inputted file creation command; determining whether a location tag is specified for a file being created and stored in the storage cluster; retrieving a creation limitation profile associated with the location tag; causing the file to be created with a location limitation in the storage cluster based on the creation limitation profile; and storing an identifier for the creation limitation profile in an extended inode structure.

BRIEF DESCRIPTION OF THE DRAWINGS

These and other features of this invention will be more readily understood from the following detailed description of the various aspects of the invention taken in conjunction with the accompanying drawings in which.

Figure 1:
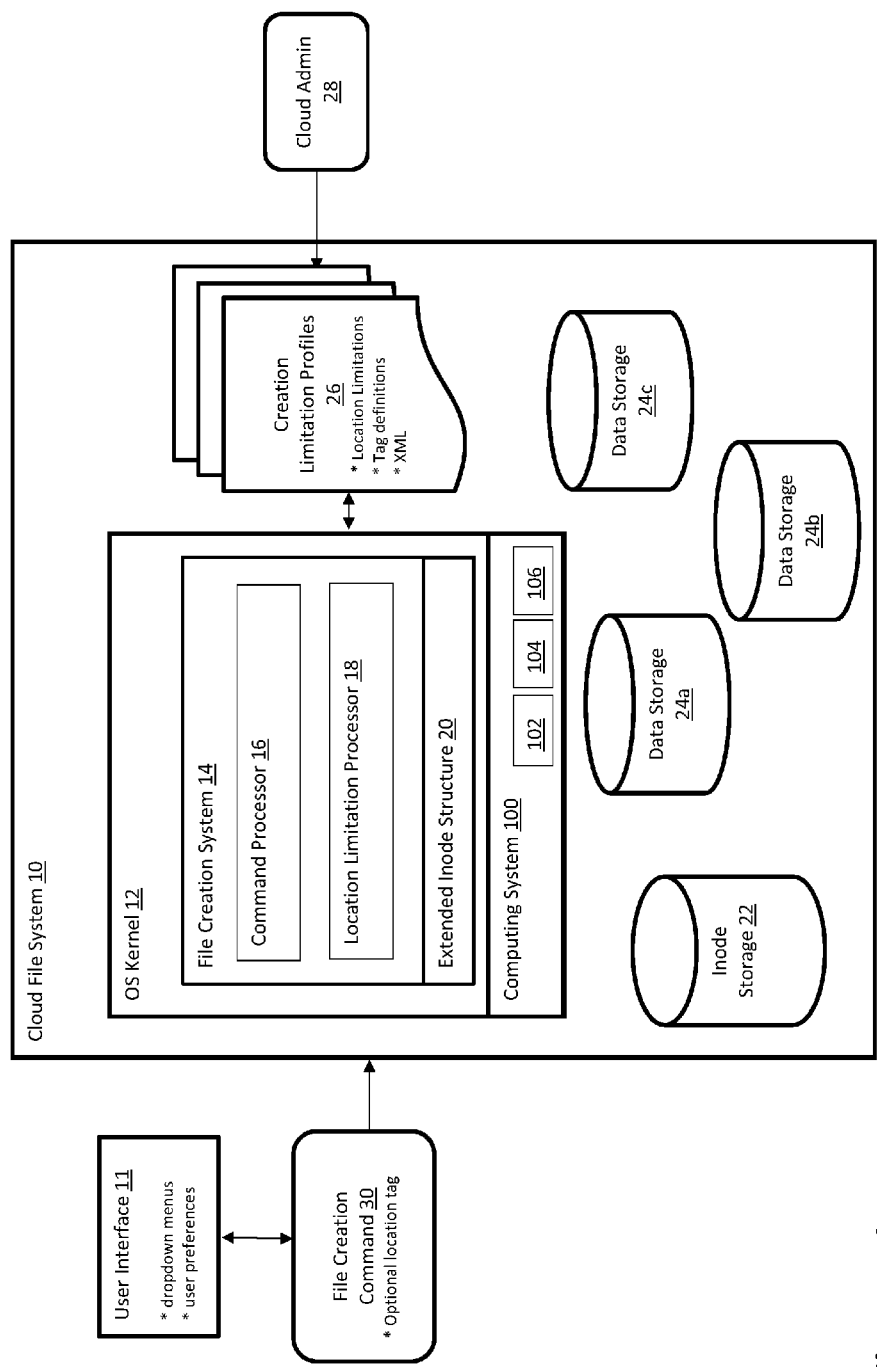
FIG. 1 shows a cloud file system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a cloud file system 10 having an infrastructure for limiting the location of files created therein. In this example, cloud file system 10 includes an operating system kernel 12 having a file creation system 14 for creating and storing files in a storage cluster shown as data storage 24a, 24b, 24c in response to an inputted file creation command 30. The file creation command 30 may for example be generated manually or by a user interface 11 based on dropdown menus, user preferences, etc. As shown, file creation command 30 may include an optional location tag that limits the location of the created file to a predefined location such as, e.g., a volume slice, a storage logical unit number (LUN), a server, or a data center. Optional predefined locations are determined in advance by a cloud administrator 28 who generates a creation limitation profile 26 for each location limitation option. The location limitation options may be incorporated into the dropdown menu options presented to a user via user interface 11, e.g., as follows:

Location Limitations:
Option 1: Data Center ABC
Option 2: Data Center XYZ
Option 3: Server 1.1
Option 4: LUN 2.3

Once selected, user interface 11 generates a corresponding file creation command 30.

When file creation command 30 is generated and inputted into file creation system 14, and command processor 16 parses the command to determine if an optional location tag is specified. If the optional location tag is specified, location limitation processor 18 will notify the operating system (OS) kernel 12 that the file has a location limitation, and will retrieve a corresponding creation limitation profile 26 that details the location limitation details. The file will then be created and stored by the OS kernel 12 according to the location limitation details.

In addition, file creation system 14 is implemented with an extended inode structure 20 that is used when generating and storing file inodes in inode storage 22. File inodes are data structures that store metadata about each created file, including attributes such as access control, creation time, modification time, etc. The extended inode structure 20 is enhanced to include associated location limitation conditions, e.g., by providing a field to specify the location tag information in the inode.

Figure 2:
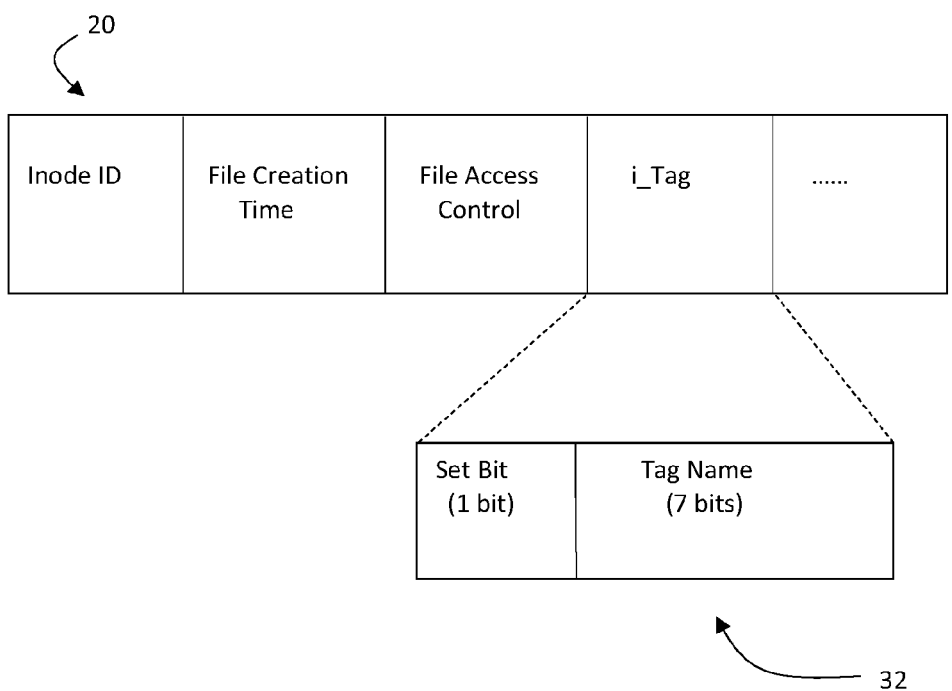
FIG. 2 shows an extended inode structure according to embodiments.

FIG. 2 depicts an example of an extended inode structure 20, which includes an additional field labeled as i_Tag 32, for storing an identifier associated with the specified location limitation conditions. In this example, i_Tag 32 includes a "set bit" that indicates whether or not a location limitation condition exists and a tag name that corresponds with an associated creation limitation profile 26 (FIG. 1).

Creation limitation profiles 26 may for example be implemented with one or more XML (extensible markup language) files generated by cloud administrator 28, e.g., via a user interface or manually. The following providing illustrative examples of tag definitions stored in XML files.

EXAMPLE 1

<Tag>
   <TagName>"01"</TagName>
   <Property>
   <DataCenter>USA NY</DataCenter>
   </Property>
</Tag>

EXAMPLE 2

<Tag>
   <TagName>"02"</TagName>
   <Property>
     <ServerHost>server001.cloudprovisioner.com</ServerHost>
     <VolumeName>volumeslice007</VolumeName>
   </Property>
   </Tag>

In the above tag definitions, Example 1 specifies a tag named "01", and defines the tag's property as "DataCenter" with value "USA NY", which means the file can only be created in the datacenter "USA NY" of this cloud provider. In Example 2, the tag definitions specify a tag named "02", and defines the tag's properties as "ServerHost" and "VolumeName" with values of "server001.cloudprovisioner.com" and "volumeslice007" respectively, meaning the file can only be created on data volume "volumeslice007" on server "server001.cloudprovisioner.com".

Using these definitions, a file can later be created with the predefined limitation by specifying "tag 01" or "tag 02" in the file creation command 20. For example, the file creation input command 30 may create a file Filename 123 specified with the syntax:

>File create Filename123—tag 01

When inputted, the file creation system 14 will recognize that a location limitation is specified, and notify the OS kernel 12 to locate the created file as specified in the associated creation limitation profile 26 for tag 01. In addition, the tag name "01" may act and an identifier and be stored in the inode associated with the created file.

It is noted that the location limitation may specify any logical location for storing the file. For example, the logical location may include a storage LUN, a logical volume, a server group, a data center, etc.

A LUN is a number used to identify a logical unit, which is a device addressed by the SCSI (small computer system interface) protocol or Storage Area Network (SAN) protocols which encapsulate SCSI, such as Fiber Channel or iSCSI. A LUN may be used with any device which supports read/write operations, such as a tape drive, but is most often used to refer to a logical disks created on a SAN. By dynamically identifying the storage LUN on which the file is created, several benefits may be achieved, including but not limited to, better performance metrics, e.g., improvement of input/output speeds, reduction of read/write latency, etc.

A logical volume is the storage space that combines a set of raw block devices, and can be implemented as a concatenated set of blocks or a combination of partitions that the administrators can re-size or potentially move without interrupting system use. Typically a logical volume includes different physical volumes, in which the physical volumes can be dispersed to different geographical locations. File systems are created based on logical volumes to provide more flexibility and resilience.

A server group is a set or bundle of servers that share the same configuration for some specific purpose, e.g., servers may configured in a common internet zone to share the same security policy, or as a server cluster to avoid a single point of failure. Servers may be virtual or physical, the virtual servers can be dispersed to different physical hosts and may be dispersed to different geographical locations. The server group limitation provides scalability to the administrator when, e.g., there is a requirement of separation of file locations at the server level.

Data centers are facilities used to host computer systems and associated components. One typical scenario for file creation limitation at the data center level in a cloud environment occurs when the file should be created according to audit purpose, and should not be moved across data centers.

Figure 3:
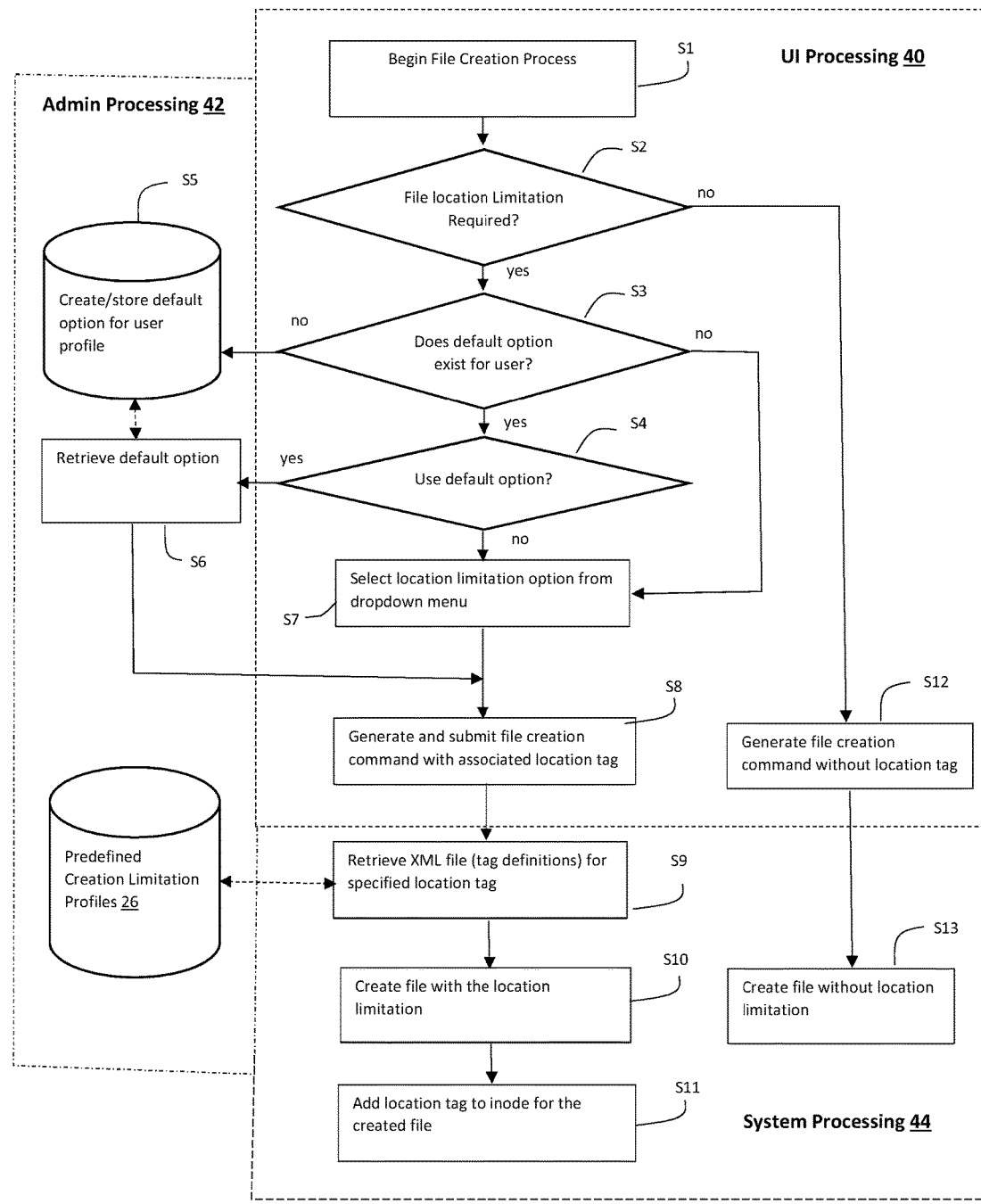
FIG. 3 shows a flow diagram of a file creation process according to embodiments.

FIG. 3 depicts a flow diagram of a file creation process (with reference to FIG. 1) broken into user interface (UI) processing 40 that includes activities generally implemented by an end user and user interface 11, administrative processing 42 including activities managed by the cloud administrator 28, and system processing 44 that includes activities implemented by the file creation system 14.

The file creation process begins at S1 in which an end user (or other system) seeks to create a file in the cloud file system 10. At S2, a determination is made whether a file location limitation is required, e.g., based on a query from the user interface 11. If no, a file create command 30 is generated at S12 without a location tag and the file is created without any location limitation at S13. If yes, then a determination is made whether a default option for a location limitation exists for the user at S3. For example, the user may have a preference that a particular data center is always used. If there is no default option stored for the user, a default setting may be created and stored in a profile for the user at S5 (e.g., based on a query from an administrative processing task or a later selected option). If there is a default option set for the user, a determination is made at S4 whether the user would like to use the default. If yes, the location limitation information for the default option is retrieved at S6. If the user elects not to use the default option, or there no default option exists for the user, the user is prompted to specify a location limitation option, e.g., a from dropdown menu at S7. At S8, a file creation command 30 with the associated location tag for the location limitation option is generated either based on the selected location option (S7) or a selected default option (S6), and the command 30 is submitted to the cloud file system 10.

Once received and parsed, file creation system 14 retrieves the XML, file (i.e., predefined creation limitation profile 26) at S9 for the associated location tag submitted in command 30. The file is then created at S10 with the specified location limitation and the location tag is stored in the corresponding inode for the created file.

It is understood that although this disclosure includes a detailed description that may be utilized to provide cloud-based computing services, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 4:
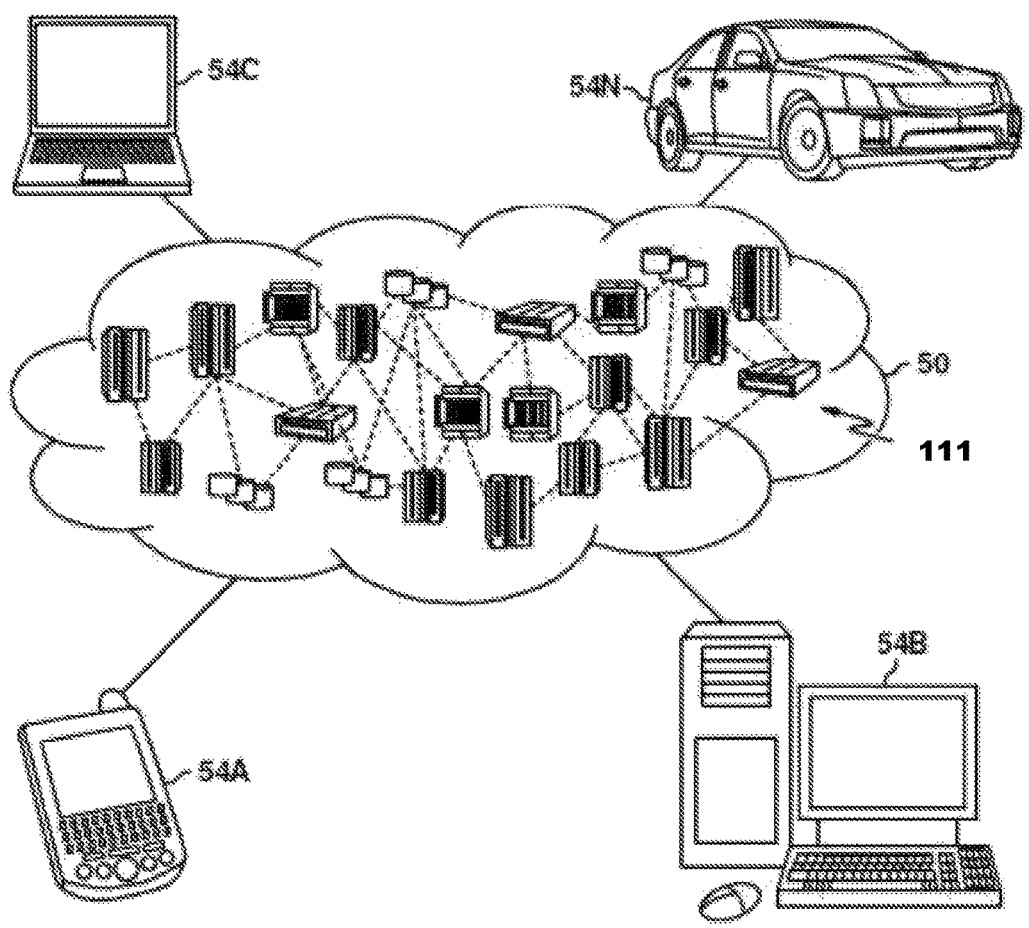
FIG. 4 depicts a cloud computing environment according to embodiments.

A cloud computing environment is service oriented with a focus on statelessness, low coupling, modularity, and semantic interoperability. At the heart of cloud computing is an infrastructure comprising a network of interconnected nodes. Referring now to FIG. 4, illustrative cloud computing environment 50 is depicted. As shown, cloud computing environment 50 comprises one or more cloud computing nodes 111 with which local computing devices used by cloud consumers, such as, for example, personal digital assistant (PDA) or cellular telephone 54A, desktop computer 54B, laptop computer 54C, and/or automobile computer system 54N may communicate. Nodes 111 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 111 and cloud computing environment 50 can communicate with any type of computerized device over any type of network and/or network addressable connection (e.g., using a web browser).

Figure 5:
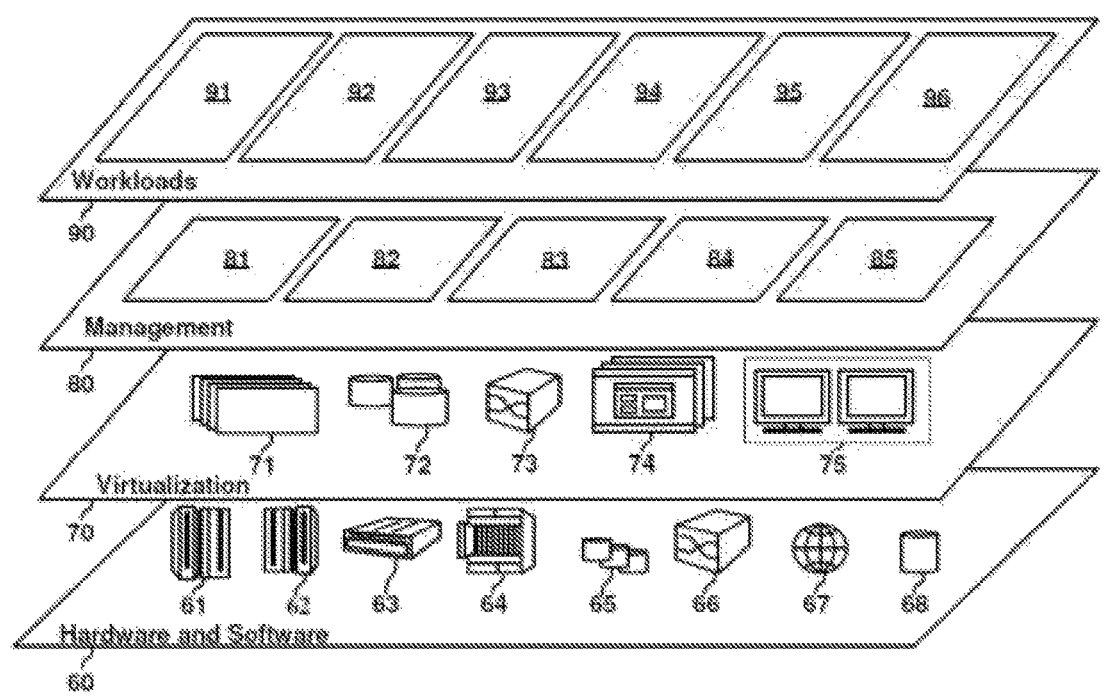
FIG. 5 depicts a set of functional abstraction layers provided by cloud computing environment according to embodiments.

Referring now to FIG. 5, a set of functional abstraction layers provided by cloud computing environment 50 (FIG.

4) is shown. It should be understood in advance that the components, layers, and functions shown in FIG. 5 are intended to be illustrative only and embodiments of the invention are not limited thereto. As depicted, the following layers and corresponding functions are provided: Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in this case DRaaS.

It is understood that file creation system 14 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

File creation system 14 (as well as OS kernel 12) may be implemented on any type of computing system 100 and for example includes at least one processor 102, memory 104, an input/output (I/O) 106 (e.g., one or more I/O interfaces and/or devices), and a communications pathway. In general, processor(s) 102 execute program code which is at least partially fixed in memory 106. While executing program code, processor(s) 102 can process data, which can result in reading and/or writing transformed data from/to memory and/or I/O 104 for further processing. The pathway provides a communications link between each of the components in computing system 100. I/O 104 can comprise one or more human I/O devices, which enable a user or other system to interact with computing system 100. Computing system 100 may also be implemented in a distributed manner such that different components reside in different physical locations.

Furthermore, it is understood that the file creation system 14 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A file creation system for a storage cluster, comprising:
a command processor that parses an inputted file creation command and determines whether a location tag is specified in the file creation command for a file being created and stored in the storage cluster; and
a location limitation processor that, in response to the location tag being specified: retrieves a creation limitation profile associated with the location tag; causes the file to be created with a location limitation in the storage cluster based on the creation limitation profile; and
stores an identifier for the creation limitation profile in an extended inode structure corresponding to the file; wherein the extended inode includes a set bit that indicates whether or not a location limitation condition exists.

2. The file creation system of claim 1, wherein the location limitation includes at least one of a specified data center, a specified server, a specified storage logical unit number (LUN), or a specified data volume.

3. The file creation system of claim 1, wherein the creation limitation profile is retrieved from a plurality of creation limitation profiles.

4. The file creation system of claim 3, where the plurality of creation limitation profiles are stored in at least one XML file.

5. The file creation system of claim 1, further comprising a user interface that includes a dropdown menu that lists a plurality of location limitation options.

6. The file creation system of claim 1, wherein the extended inode includes a field for storing the identifier.

7. The file creation system of claim 1, wherein the location limitation processor interacts with an operating system kernel to create files with location limitations.

8. A computer program product stored on a computer readable storage medium, which when executed by a computing system, provides a file creation system for a storage cluster, the program product comprising:
program code that parses an inputted file creation command and determines whether a location tag is specified in the file creation command for a file being created and stored in the storage cluster; and
program code that, in response to the location tag being specified:
retrieves a creation limitation profile associated with the location tag; causes the file to be created with a location limitation in the storage cluster based on the creation limitation profile; and
stores an identifier for the creation limitation profile in an extended inode structure corresponding to the file; wherein the extended inode includes a set bit that indicates whether or not a location limitation condition exists.

9. The program product of claim 8, wherein the location limitation includes at least one of a specified data center, a specified server, a specified storage logical unit number (LUN), or a specified data volume.

10. The program product of claim 8, wherein the creation limitation profile is retrieved from a plurality of creation limitation profiles.

11. The program product of claim 10, where the plurality of creation limitation profiles are stored in at least one XML file.

12. The program product of claim 8, further comprising a user interface that includes a dropdown menu that lists a plurality of location limitation options.

13. The program product of claim 8, wherein the extended inode includes a field for storing the identifier.

14. The program product of claim 8, further comprising program code that interacts with an operating system kernel to create files with location limitations.

15. A computerized method that provides file creation for a storage cluster, comprising:

parsing an inputted file creation command;

determining whether a location tag is specified in the file creation command for a file being created and stored in the storage cluster;

retrieving a creation limitation profile associated with the location tag;

causing the file to be created with a location limitation in the storage cluster based on the creation limitation profile; and storing an identifier for the creation limitation profile in an extended inode structure corresponding to the file; wherein the extended inode includes a set bit that indicates whether or not a location limitation condition exists.

16. The computerized method of claim 15, wherein the location limitation includes at least one of a specified data center, a specified server, a specified storage logical unit number (LUN), or a specified data volume.

17. The computerized method of claim 15, wherein the creation limitation profile is retrieved from a plurality of creation limitation profiles.

18. The computerized method of claim 17, where the plurality of creation limitation profiles are stored in at least one XML file.

19. The computerized method of claim 15, further comprising providing a user interface that includes a dropdown menu that lists a plurality of location limitation options.

20. The computerized method of claim 15, wherein the extended inode includes a field for storing the identifier.

* * * * *